UNITED STATES PATENT OFFICE.

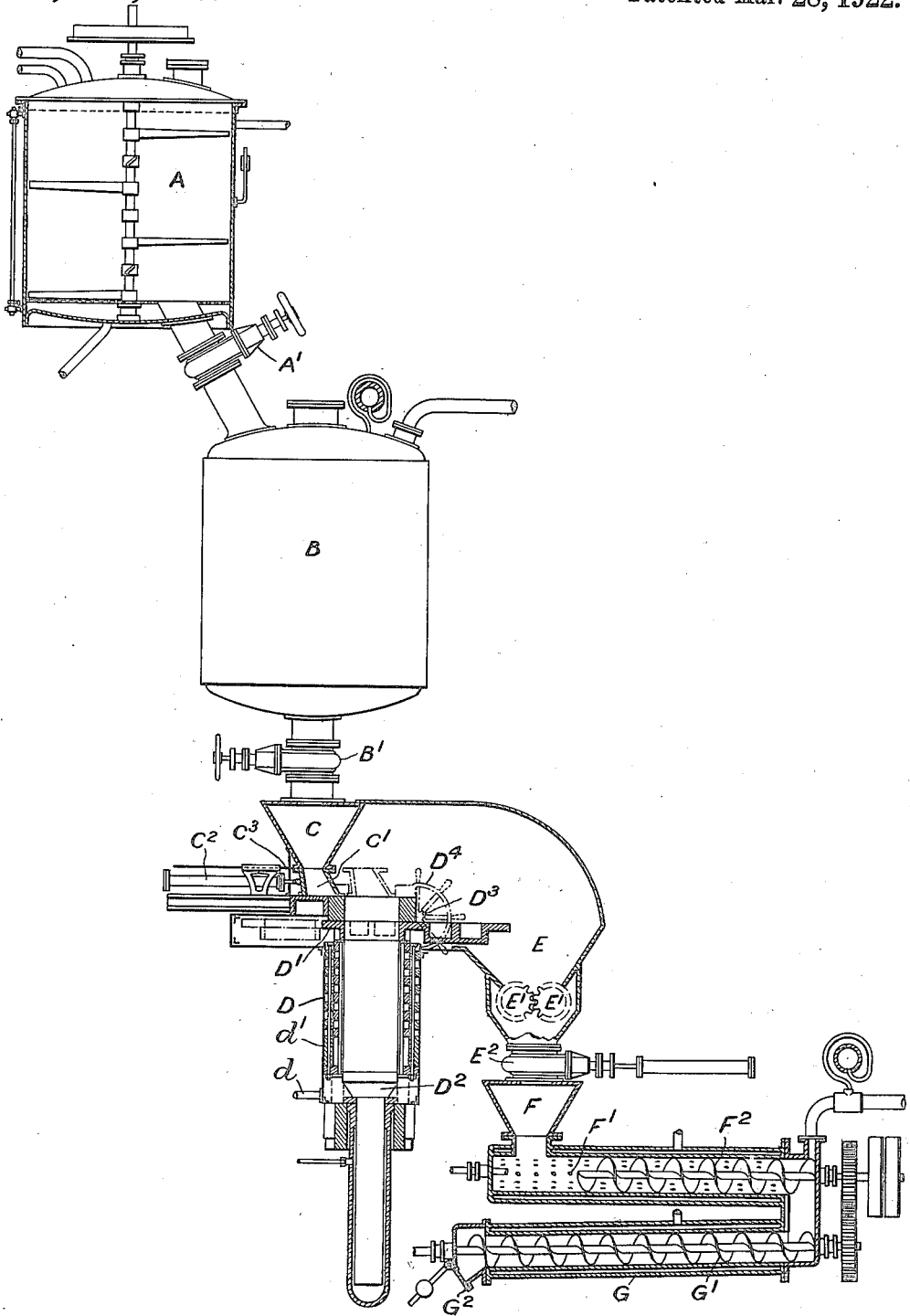

ALFRED WILLIAM MacILWAINE AND GEORGE FREDERICK HOLDCROFT, OF NORTH FERRIBY, ENGLAND.

EXTRACTION OF OIL BY VOLATILE SOLVENTS.

1,410,822.   Specification of Letters Patent.   Patented Mar. 28, 1922.

Application filed August 8, 1919. Serial No. 316,214.

*To all whom it may concern:*

Be it known that we, ALFRED WILLIAM MACILWAINE, a subject of the King of Great Britain and Ireland, residing at "Manor House," North Ferriby, in the East Riding of Yorkshire, England, and GEORGE FREDERICK HOLDCROFT, a subject of the King of Great Britain and Ireland, residing at "Yeovil," North Ferriby, aforesaid, have invented new and useful Improvements in the Extraction of Oil by Volatile Solvents, of which the following is a specification.

This invention relates to an improved process for the extraction, by means of volatile solvents, of oil from seed or other oil-yielding materials.

Usually, in carrying out the process of extraction the prepared material is charged into an "extractor" or closed vessel fitted with stirrers and a perforated false bottom. Solvent, consisting of benzoline or other suitable volatile liquid, is run in until the charge is covered; the charge is then "washed" by running in fresh solvent and drawing off the oil-charged solvent; the washing being continued until the oil in the charge is judged to be sufficiently reduced. The washing is now stopped, and the solvent allowed to drain away; leaving the charge still saturated with solvent which holds oil in solution. Live steam is then driven through the solvent-saturated charge; the steam evaporating the solvent, which is recovered by condensation.

It is found that this, the ordinary, process of extraction is attended by certain disadvantages, amongst which the following may be mentioned:—

1. The solvent contained in the charge after draining has oil in solution. When the solvent is evaporated, the oil, being non-volatile, remains in the residue and is not recovered.

2. The greater the quantity of solvent evaporated and the longer the solvent, present in the charge, is subjected to steam treatment, the greater the loss of solvent.

3. The greater the quantity of solvent left in the charge after draining, the greater the quantity of steam required to evaporate it and the greater the extent of heating required to dry the meal or residue.

Our invention in a large measure overcomes these disadvantages, and consists in subjecting the charge, after it has been washed and drained but while still saturated with solvent, to hydraulic or other pressure. The pressure is maintained until the expression of the solvent and oil in solution therein is judged to be sufficiently effected and until the mass assumes a comparatively solid condition. In thus pressing the charge, we expel from it the major portion of the solvent; the latter carrying with it the oil held in solution. The charge thus compressed is again reduced to a mealy or porous condition; whereupon the solvent not already expressed is recovered by means of steam and by condensation in the usual manner.

Owing to the smaller quantity of steam necessary to recover the remaining solvent, a saving of steam is effected and a drier meal product is obtained. Owing to the smaller quantity of solvent to be evaporated and condensed, and to the reduced period during which the charge is subjected to the action of steam, less loss of solvent takes place.

Apparatus adapted for use in carrying our invention into effect is illustrated diagrammatically in the accompanying drawing. The operation of extracting and compressing may be conducted in the same vessel or in separate vessels. In the present illustration, these operations are conducted in separate vessels; A representing the extractor, and D the compressor. B is an intermediate container for the reception of the solvent-charged meal discharged from the extracting vessel A, pending its delivery to the compressing chamber D. The solvent-charged meal escaping from the intermediate vessel B, or from the extracting vessel A as the case may be, is received in a closed hopper C, at the base of which is arranged feed apparatus comprising a horizontally sliding box $C^1$, actuated by a hydraulic cylinder $C^2$ or other suitable means, with the object of conveying its contents, received from the hopper C, and discharging the same directly above the hydraulic press D. In co-operation with the feed-box $C^1$ is a cover plate $C^3$ which serves to close the bottom of the hopper C when the box $C^1$ is advanced as above described. The hydraulic press D is or may be of a type commonly employed in expressing oil from meal; the barrel being composed of metal strips arranged longitudinally side by side and encircled by bands of adequate strength. Immediately above the upper extremity of the barrel is arranged a horizontally sliding plate $D^1$, one portion of which is solid, whilst in the other portion is formed an orifice which corresponds in diameter with that of the plunger $D^2$. The upper face of the sliding plate $D^1$ is provided with a toothed rack which meshes with a pinion $D^3$; the latter being fast upon the spindle of a hand-wheel $D^4$.

The action of the apparatus is as follows:—The orifice in the sliding plate $D^1$ being over the cylinder or barrel of the press D and the plunger $D^2$ being at the bottom thereof, the to and fro action of the feed-box $C^1$ proceeds until the barrel is fully charged. The sliding plate $D^1$ is then moved so as to bring its solid portion above the barrel, thereby closing its upper end. The plunger then rises and compresses the mass, thereby expelling the oil-charged solvent; the latter escaping through the sides of the barrel and being drained away by the pipe $d$ at the bottom of the casing $d^1$. The sliding plate $D^1$ is now restored to its previous position and the plunger $D^2$ further raised so as to bring the compressed charge of meal into the path of the sliding box $C^1$, which, at its next forward movement, pushes the compressed charge of meal off the plunger $D^2$ and causes it to fall into the hopper E. The pressure beneath the plunger $D^2$ being thereupon released, the latter again descends to the bottom of the barrel, and the feeding action of the box $C^1$ is resumed.

At the base of the hopper E, is arranged breaking apparatus of any appropriate type; as, for example, a pair of wheels $E^1$, revolving in opposite directions and furnished with saw or other teeth. The state in which the meal reaches this apparatus may be described as compact but is nevertheless capable of being readily reduced to a mealy condition.

Upon leaving the chamber of the breaking apparatus $E^1$, the meal passes, by way of a closed hopper F, to a perforated cylinder $F^1$ furnished with a steam-jacket and internally provided with a feed-screw and agitator $F^2$ for conveying the meal longitudinally from beneath the hopper F to the opposite end of the cylinder $F^1$, and there discharging it to the steam-jacketed drying cylinder G, furnished with an agitating feed-screw $G^1$. During the passage of the meal through this cylinder, it becomes thoroughly dried, and is ultimately discharged past the loaded flap $G^2$.

The outlets from the vessels A, B and E, are respectively furnished with valves $A^1$, $B^1$, $E^2$, for controlling the passage of the material under treatment.

The intermediate container B, as also the steaming and drying cylinders $F^1$ and G are connected with an air-pump or other exhauster with a view to the withdrawal of solvent-charged vapour and the recovery of the solvent by condensation.

It will be observed that the whole of the operations described are conducted without exposing the material to the atmosphere.

We claim:—

A process for the extraction of oil by volatile solvents, consisting in treating the oil-yielding material in an extractor with a suitable solvent such as benzoline, and, when sufficiently washed, draining off the oil-bearing solvent, subjecting the meal without exposure to the atmosphere to pressure, breaking up the compressed mass so as to restore it to a mealy condition, and then treating it with steam for the purpose of removing and recovering the residual solvent, substantially as set forth.

ALFRED WILLIAM MacILWAINE.
GEORGE FREDERICK HOLDCROFT.